United States Patent [19]

Haag et al.

[11] Patent Number: 4,684,819

[45] Date of Patent: Aug. 4, 1987

[54] VEHICLE DAYTIME RUNNING LAMPS

[75] Inventors: Ronald H. Haag, East Detroit; Edgar H. Schlaps, Washington, both of Mich.

[73] Assignee: General Motors Corporation, Detroit, Mich.

[21] Appl. No.: 918,354

[22] Filed: Oct. 14, 1986

[51] Int. Cl.⁴ .............................................. B60Q 1/02
[52] U.S. Cl. .............................. 307/10 R; 307/10 LS; 315/82; 315/83; 340/92
[58] Field of Search .......................... 307/10 R, 10 LS; 315/82, 83, 80, 77; 340/92; 362/1, 61

[56] References Cited

U.S. PATENT DOCUMENTS

| | | | |
|---|---|---|---|
| 3,341,736 | 9/1967 | Fortney | 315/82 |
| 3,832,597 | 8/1974 | Mitchell | 315/82 |
| 4,114,071 | 9/1978 | Thrower, Jr. et al. | 315/226 |
| 4,309,639 | 1/1982 | Thrower, Jr. et al. | 315/82 |
| 4,599,544 | 7/1986 | Martin | 307/10 LS X |

Primary Examiner—William M. Shoop, Jr.
Assistant Examiner—Sharon D. Logan
Attorney, Agent, or Firm—David L. Ahlersmeyer

[57] ABSTRACT

A motor vehicle daytime running light circuit is disclosed in which the high beam headlights are energized at a reduced intensity in response to a predetermined vehicle operating condition including, for example, the headlight switch being in the off position. Power to the high beam headlights is supplied through a field-effect transistor that is modulated by an oscillator operating at a frequency sufficient to maintain the headlights at a constant intensity. Circuitry that senses the predetermined vehicle operating condition enables the oscillator and disables a high beam indicator.

9 Claims, 3 Drawing Figures

VEHICLE DAYTIME RUNNING LAMPS

This invention relates to a vehicle lighting circuit wherein the high beam indicator that is normally energized during operation of the high beam headlights is disabled whenever the high beam headlights are operated at less than full intensity, i.e., when they are energized at a reduced intensity by a daytime running light circuit.

More particularly, the present invention is applicable to a vehicle headlight circuit having low beam and high beam headlights, in which a daytime running light circuit energizes the high beam headlights at less than full intensity to improve vehicle conspicuity during daytime driving. The high beam rather than low beam lights are used in such a circuit because they require less power to produce the same level of intensity and they are typically aimed such that they are more conspicuous to oncoming traffic. However, a problem arises in such a circuit because the high beam indicator does not distinguish between reduced and full intensity operation of the high beam headlights, i.e., it is on during both modes of high beam headlight operation.

This problem creates uncertainty for the driver of the vehicle as to the active mode of operation and state of illumination of the headlights when the high beam indicator is energized. For example, the driver could incorrectly assume that the headlights are on and providing increased illumination (high beam full intensity) when instead only the reduced intensity daytime running lights are on. The present invention alleviates the above problem by providing a daytime running light circuit that disables operation of the high beam indicator whenever the high beam headlights are energized at a reduced intensity for daytime driving. Specifically, the circuit of the present invention includes vehicle operating condition sensing circuitry that serves the dual purpose of disabling the high beam indicator and enabling a chopper circuit for providing a reduced average voltage to the high beam headlights. For example, vehicle operating conditions under which the daytime running lights would be operative could include the ignition being on, the headlight switch being off, the gear selector being in other than the park position, the emergency brake being off, the turn signals being off, and the seat belt being fastened. Accordingly, pursuant to the invention, the high beam indicator is energized for normal full intensity operation of the high beam headlights, but is disabled when the daytime running light circuit is providing reduced average voltage to the high beam headlights.

The invention is further described below, as to a specific embodiment, in conjunction with the following drawings.

Figure 1:
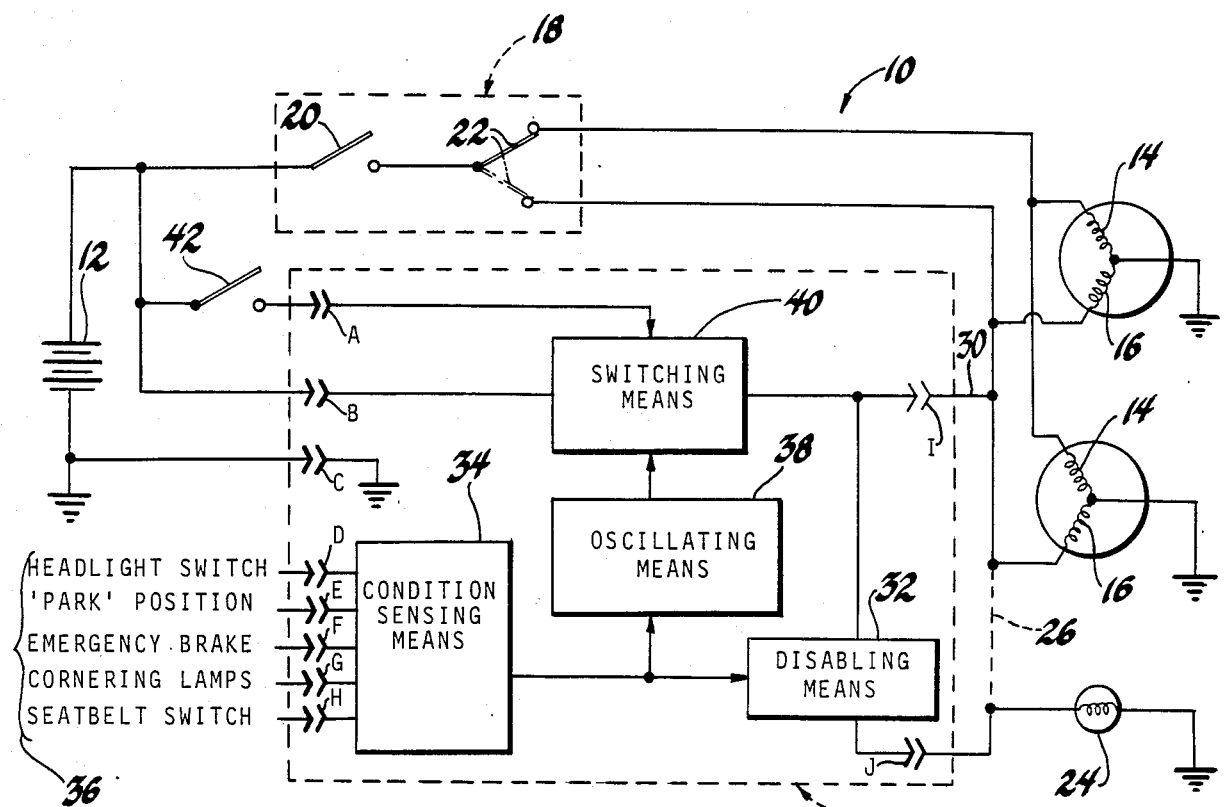
FIG. 1 is a schematic circuit diagram of an exemplary vehicle headlight circuit to which the present invention is applicable, including a block diagram of the daytime running light circuit of the present invention.

Referring now to FIG. 1, there is depicted a vehicle headlight circuit 10 of the type to which the present invention is applicable. The circuit 10 includes a DC voltage source 12 for energizing the low beam filaments 14 and the high beam filaments 16 of the vehicle headlights through a switch means 18. For purposes of illustration, but without any limitation of the invention, the switch means 18 may include a headlight switch 20 and a dimmer switch 22 arranged such that the switch means 18 has an off position, a low beam position, and a high beam position for selectively energizing no headlights, the low beam headlight filaments 14, and the high beam headlight filaments 16, respectively. A high beam indicator 24 is electrically connected in parallel with the high beam filaments 16 with a conductor 26. For purposes of illustration, but without any limitation of the invention, the high beam indicator 24 may be a standard incandescent lamp so as to provide a visible indication to the driver that the high beam headlights are energized.

In the usual manner, for night driving, either the low beam filaments 14 or the high beam filaments 16 are energized by power supplied from the positive terminal of the DC voltage source 12, which may be, for example, the vehicle battery. When the operator places the switch means 18 in the high beam position, the headlight switch 20 is on and the dimmer switch 22 is providing power to the high beam filaments 16 and the high beam indicator 24.

The vehicle headlight circuit 10 of FIG. 1 also includes a daytime running light circuit 28, to provide reduced power for diminished illumination of the vehicle high beam headlight filaments 16 during daytime operation. It is advantageous to use the high beam headlights as daytime running lights because they are ordinarily aimed higher than the low beam headlights, thus making the vehicle more conspicuous to oncoming traffic. Also, the high beam headlights require less power than the low beam headlights to produce the same light intensity. The daytime running light circuit 28 is diagramatically represented within a box shown in FIG. 1. During operation, the circuit 28 provides a reduced average voltage output to the high beam filaments 16 through a conductor 30. A problem arises in a daytime running light circuit as described, in that the high beam indicator 24 remains connected in parallel with the high beam filaments 16 and thereby remains energized during both operating modes of the high beam headlights, i.e., the full intensity night mode and the reduced intensity daytime running light mode. A vehicle operator is not able, on the basis of the high beam indicator, to determine which mode of headlight operation is active.

The present invention alleviates the above problem by disabling the high beam indicator when the daytime running light circuit is operable. In the illustrated embodiment of the invention, as depicted in FIG. 1, the high beam indicator 24 that is normally connected in parallel with the high beam filaments 16 through the conductor 26 is instead connected in parallel through a disabling means 32. Therefore, in practicing the principles of the present invention, the direct electrical connection normally present between the high beam filaments 16 and the high beam indicator 24, i.e., the conductor 26, is replaced with the disabling means 32 capable of selectively providing conductivity for operation of the high beam indicator 24.

Together with the disabling means 32, the remainder of the daytime running light circuit 28 is shown functionally in FIG. 1 and operates in the usual manner according to the following description. A condition sensing means 34 tests several vehicle condition inputs 36 to determine whether a predetermined vehicle operating condition exists under which the daytime running lights are to operate. If the vehicle condition inputs 36 satisfy the predetermined vehicle operating condition, the sensing means 34 enables both an oscillating means 38 and the disabling means 32. In turn, the oscillating means 38 determines the average voltage supplied from the D.C. power source 12 to the high beam filaments 16 by turning on and off the switching means 40 at a specified frequency and duty cycle (percentage of "on time" per cycle) sufficient to insure constant, reduced intensity headlight illumination.

The frequency and duty cycle at which to operate the oscillating means 38, and ultimately to switch on and off the high beam headlights, were chosen according to several photometric and circuit design criteria. The rise time and fall time of the headlight voltage signal were also a concern because of heat dissipation in the field-effect transistor of the switching means and the production of radio frequency and electro-magnetic interference. To achieve a desired candella rating of approximately 5000 for a typical high beam vehicle headlight system, a frequency of 100-120 Hz., a duty cycle of 25%, a rise time of approximately 50 microseconds, and a fall time of approximately 100 microseconds were chosen. Operating at these parameters, the daylight running light circuit 28 provides constant, reduced intensity high beam headlight illumination.

In the illustrated embodiment of the invention, the daytime running light circuit 28 includes inputs A-H and outputs I and J. Input A is the ignition voltage supplied from the D.C. power source 12 through an ignition switch 42. Input A is energized when the ignition switch 42 is on, i.e., the car is running. Input B is uninterruptable power supplied from the D.C. power source 12, while input C establishes a common ground between the vehicle headlight circuit 10 and the daytime running light circuit 28. Inputs D-H represent the vehicle condition inputs 36 which are tested for by the condition sensing means 34. For purposes of illustration, but without any limitation of the invention, the vehicle condition inputs 36 can be established as shutdown conditions, i.e., conditions under which the daytime running lights will not operate, thereby making the predetermined operating condition under which the daytime running lights operate the absence of a shutdown condition. Inputs D-H may be either electrically grounded (active low shutdowns) or electrically energized (active high shutdowns), depending upon the electrical signal available from the particular vehicle condition. For example, to turn off the daytime running lights when the headlight switch 20 is turned on, input D would have to be an active high shutdown in response to voltage being applied to input D through headlight switch 20. In like manner, when the emergency brake is engaged, an electrical switch tied to input E is grounded and, therefore, input E would need to be an active low shutdown responding to a grounded input. Other shutdown conditions contemplated by the present invention, without any limitation thereof, include a the transmission selector of a car having automatic transmission being in the "park" position, the cornering lamps of a car being energized indicating a turn signal switch being activated, and the failure of passengers to fasten the vehicle seat belts. Any vehicle condition capable of providing an electrically energized or grounded input to the daytime running light circuit 28 could be incorporated therein.

Output I is connected to the high beam filaments 16 and output J is connected to the high beam indicator 24.

Figure 2:
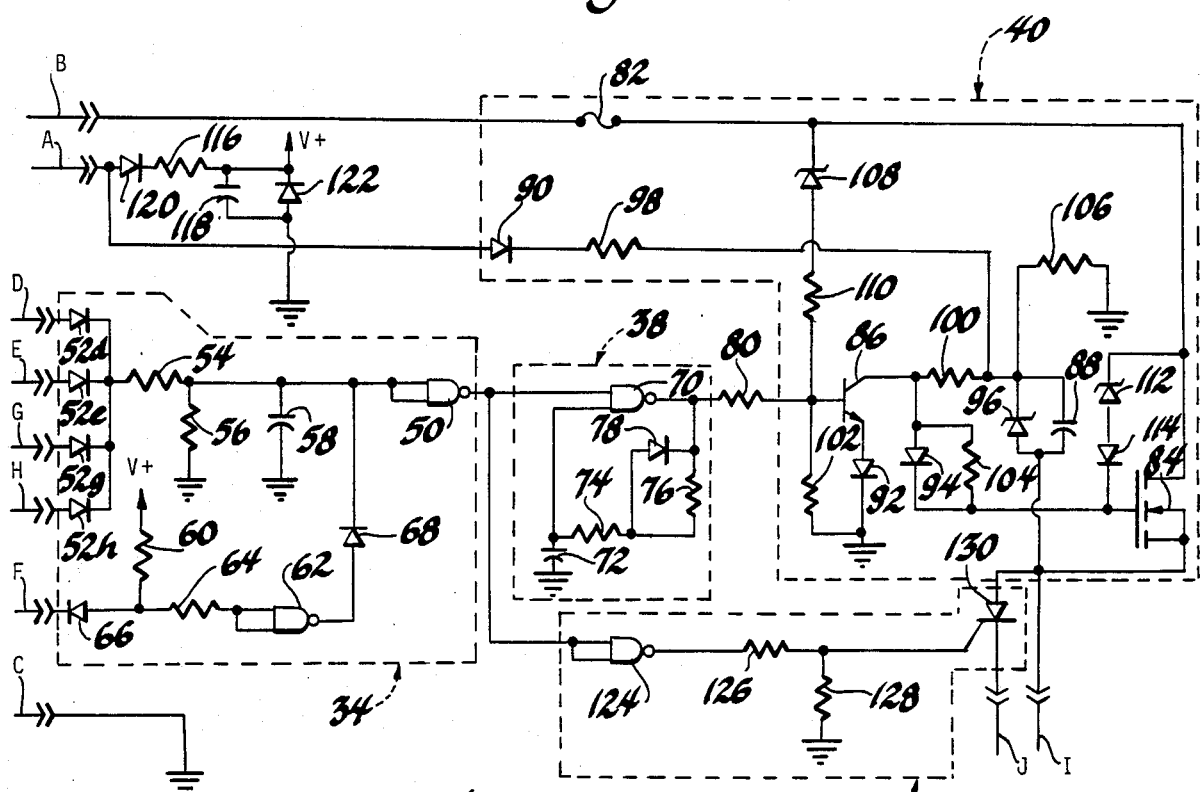
FIG. 2 is a schematic circuit diagram of the daytime running light circuit of FIG. 1 according to one embodiment of the present invention.

Referring now to FIG. 2, there is shown one embodiment of the daytime running light circuit 28 of FIG. 1, according to the present invention. The electrical components constituting the circuit 28 are grouped in FIG. 2 according to the functional blocks presented in FIG. 1, namely, the condition sensing means 34, the disabling means 32, the oscillating means 38 and the switching means 40. Inputs A-H and outputs I and J, shown in FIG. 2, correspond identically to those shown in and described in connection with FIG. 1.

An RC filtering network, comprising a resistor 116, a capacitor 118, and two diodes 120 and 122, provides voltage $V^+$ to the integrated circuits, i.e., NAND gates, of the daytime running light circuit 28. The filtered voltage $V^+$ does not contain ignition noise normally present on input A (ignition voltage).

In the condition sensing means 34, active high inputs D, E, G, and H provide a high input to a NAND gate 50 (configured as an inverter) through diodes 52$d$, 52$e$, 52$g$ and 52$h$, respectively, and an RC network comprising two resistors 54 and 56 and a capacitor 58. In like manner, a grounded input to active low input F results in a high input to NAND gate 50. A pull-up resistor 60 is connected to the voltage $V^+$ to ordinarily provide a high input to a NAND gate 62 (configured as an inverter) through a resistor 64. However, when input F is grounded current flows from $V^+$ to ground through a diode 66 and a low input is applied to the NAND gate 62, where by a high input is applied to the NAND gate 50 through a diode 68. In operation, the output of the NAND gate 50 is low whenever an active high input or an active low input is applied to its respective input, and is high otherwise. It will be appreciated that the embodiment of the condition sensing means 34 shown in FIG. 2 operates as a logical NOR gate insofar as a low output is produced whenever an active shutdown input is present. The use of a logical AND gate arrangement for the condition sensing means, wherein a high output would be produced whenever all requisite inputs are present, would not depart from the spirit of the invention in repect to testing for the existence of a predetermined vehicle operating condition under which to operate the daytime running lights.

circuit consisting of a NAND gate 70, a capacitor 72, two resistors 74 and 76, and a diode 78. The on time and the off time of the timing circuit is determined by the values of the resistors 74 and 76 and the capacitor 72. Reversing the direction of the diode 78 reverses the high and low times of the output signal.

The output of the oscillating means 38 is applied to the switching means 40 through a resistor 80. The switching means 40 provides power from input B (D.C. power source 12) to output I (high beam filaments 16) through a fuse 82 and a transistor 84. In the preferred embodiment, the transistor 84 is a field-effect transistor capable of carrying the high beam headlight current with a small voltage drop across the transistor itself, such as a Siliconix BUZ 11. The transistor 84 is placed on the high voltage side of the headlight load so that the headlights may remain connected directly to ground. In this configuration, to keep the field-effect transistor in the ohmic region with a large drain current flow, the gate must be approximately 10 volts above the source potential. In order to provide the higher gate voltage necessary to keep the transistor 84 turned on, a bootstrap technique is employed, whereby as the source voltage rises, the gate voltage rises simultaneously. This bootstrap circuit consists of a transistor 86, a capacitor 88, three diodes 90, 92 and 94, a zener diode 96 and five resistor 98, 100, 102, 104 and 106. The diode 94 and the resistors 100 and 104 determine the rise and fall times of the voltage waveform at output I, thereby reducing or eliminating radio frequency or electro-magnetic interference. The diode 94 may be reversed to bypass resistor 104, thereby selectively increasing either the rise or fall time. The resistor 106 allows the capacitor 88 to discharge after the ignition is turned off to protect the transistor 84 from remaining partially on due to voltage being applied to the gate by the charged capacitor 88.

A zener diode 108 and a resistor 110 may be added to turn off the daytime running lights to avoid headlight burnout in the event of a voltage greater than 16 volts being supplied by input B (D.C. voltage source 12), i.e., a 24-volt jump start voltage. Also, a zener diode 112 and a diode 114 may be added to turn on the daytime running lights to protect the transistor 84 in the event a transient voltage greater than 36 volts is present at input B, i.e., an accidental disconnected battery load dump condition. It will be appreciated that power is provided to the circuit of switching means 40 from input A (ignition), thereby causing the daytime running light circuit 28 to be fully operative only when the ignition is turned on. The disabling means 32, as shown in FIG. 2, comprises a NAND gate 124 (configured as an inverter), two resistors 126 and 128, and a silicon-controlled rectifier (SCR) 130. The output of the sensing means 34 is inverted by the NAND gate 124 and is then applied to the gate of the SCR 130 through the voltage divider network of the resistors 126 and 128. In the preferred embodiment, a Motorola 2N5062 SCR is chosen which determines the necessary values of the resistors 126 and 128 to provide sufficient gate trigger voltage and current. For example, to insure triggering of the 2N5062 SCR where the output of the NAND gate 124 may be as low as 8 volts, the resistor 126 would be 10k ohms and the resistor 128 would be 22k ohms. The anode of the SCR 130 is connected to output I (high beam filaments 16) and the cathode is connected to the high beam indicator 24. In operation, the high beam indicator 24 is energized only when the high beam filaments 16 are energized and the output of the sensing means 34 is low, i.e., a shutdown condition is sensed. Additionally, use of an SCR as a disabling means provides protection from false triggering and reverse voltage protection.

Figure 3:
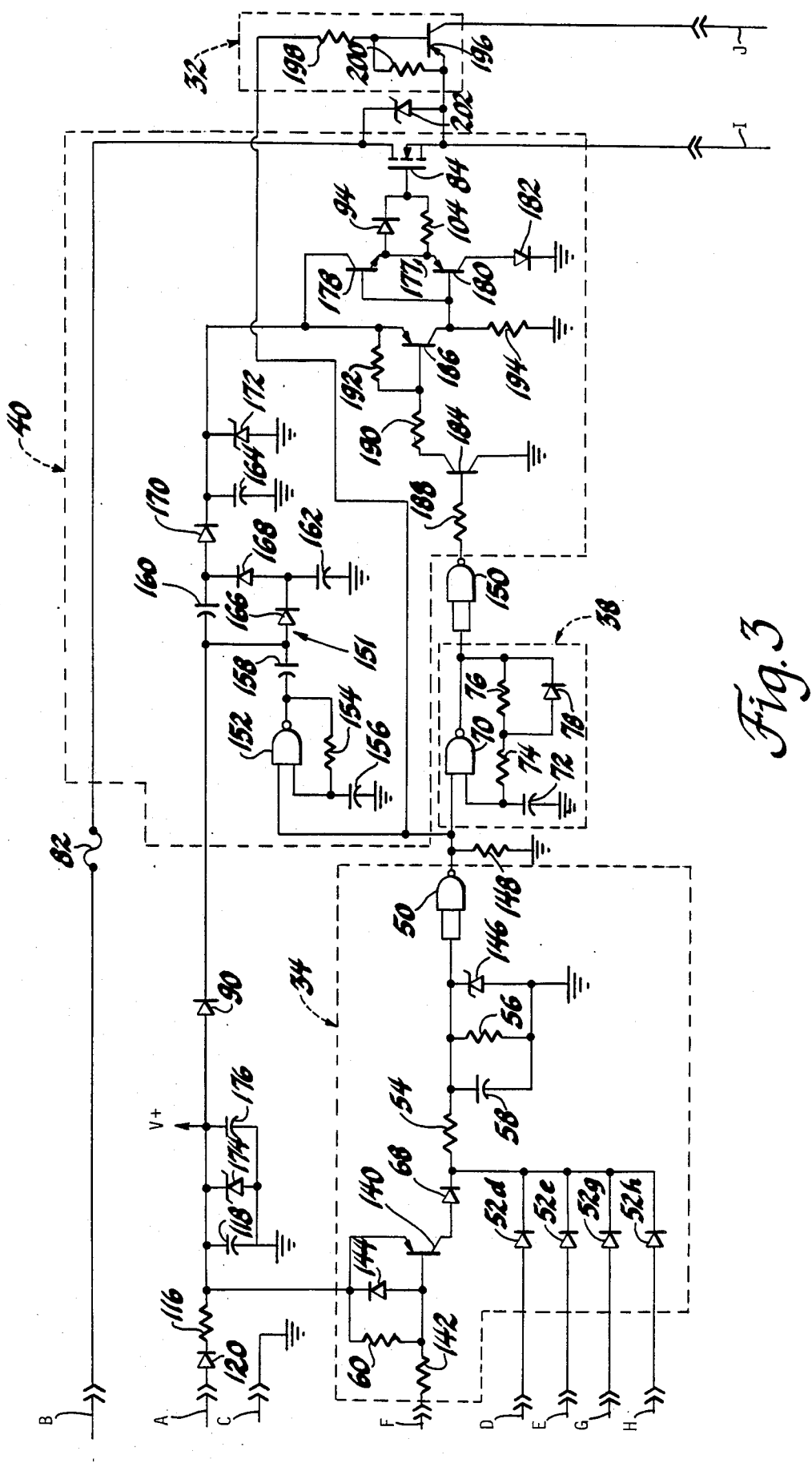
FIG. 3 is a schematic circuit diagram of a further embodiment of the daytime running light circuit of FIG. 1.

FIG. 3 shows an alternative embodiment of the present invention. More specifically, the circuit of FIG. 3 is a variation of the circuit of FIG. 2 to accomplish the same functions represented by the blocks presented in FIG. 1. Therefore, to the extent the electrical components are the same in the two embodiments, they have the same identification numbers. The discussion of the circuit of FIG. 3 focuses on its differences from the circuit of FIG. 2. Where the two circuits are similar, the discussion of FIG. 2 will be considered equally applicable.

The sensing means 34 of FIG. 3 achieves the same active high and active low input sensing function as the circuit of FIG. 2 by using a transistor 140 in conjunction with the active low input. Other added components include an input resistor 142, a diode 144 to insure that the transistor 140 turns off, and a zener diode 146.

The oscillating means 38 in FIG. 3 is identical to that used in FIG. 2. A grounded resistor 148 is added at the junction between the output of the sensing means 34 and the input to the oscillating means 38. The resistor 148 helps insure that, in the event of a failure of the NAND gate 50, the inputs to the NAND gates 70 and 152 (both configured as oscillators) will be low, thereby preventing unintended oscillation and interrupting operation of the daytime running light circuit 28.

The output of the oscillating means 38 is connected to the switching means 40 through a NAND gate 150 (configured as an inverter). This is necessary due to the different method of providing increased voltage to the gate of the field-effect transistor 84. In the embodiment of FIG. 3, a voltage tripler circuit 151, activated in response to an enabling signal from the sensing means 34, provides a constant increased voltage available for application to the gate of the transistor 84 through a push-pull transistor configuration 177. The voltage tripler circuit 151 includes an oscillator comprising a NAND gate 152, a resistor 154, and a capacitor 156. Also included in the voltage tripler circuit 151 are three capacitors 158, 160, and 162, four diodes 164, 166, 168, and 170, and a zener diode 172. In operation, the voltage tripler circuit 151 maintains approximately 36 volts across the capacitor 164 in the following manner. When the output of the NAND gate 152 initially goes from 0 volts to 12 volts, the capacitor 158 boosts the voltage across the capacitor 162 from an initial 12 volts to 24 volts, thereby charging capacitor 164 to 24 volts. During subsequent oscillation of the output of NAND gate 152 between 0 volts and 12 volts, the voltage across the capacitor 162 remains at 24 volts due to the diode 166, while the capacitor 160 boosts the voltage across the capacitor 164 is boosted from 24 volts to 36 volts, at which level it remains due to the diode 170. The voltage tripler circuit 151 is powered by input A (ignition) through a diode 120, a resistor 116 and the diode 90.

The increased voltage produced by the voltage tripler circuit 151 is switched on and off to the gate of the transistor 84 in response to the signal coming from the oscillating means 38 through the NAND gate 150, using switching transistors and the push-pull transistor configuration 177. The push-pull configuration 177 includes two transistors 178 and 180 and a diode 182, while the remainder of the switching circuit includes two transistors 184 and 186 and four resistors 188, 190, 192, and 194. In operation, when the output of the NAND gate 150 is high, both the transistors 184 and 186 are turned on, thereby turning on the transistor 178 and charging the gate of the transistor 84. In like manner, when the output of the NAND gate 150 is low, both the transistors 184 and 186 are turned off, thereby turning on the transistor 180 and discharging the gate of the transistor 84. It will be appreciated that the voltage tripler circuit 151 and the push-pull transistor configuration 177 are particularly suited for higher frequency switching applications. For lower frequency applications, the push-pull transistor configuration 177 could be replaced with a single transistor which would eliminate several voltage drops, thereby allowing the use of a voltage doubler circuit instead of the voltage tripler circuit 151 to provide a voltage sufficient to operate the transistor 84 as a high side switch. A zener diode 202 has been added to the circuit in FIG. 3 to protect the transistor 84 in the event of high transient voltages.

The disabling means 32 of the embodiment of FIG. 3 differs from the embodiment of FIG. 2 in that a bipolar transistor replaces the silicon-controlled rectifier. Therefore, in FIG. 3, there is shown a transistor 196 connected between output I (high beam filaments 16) and output J (high beam indicator 24). The transistor 196 conducts when the high beam headlights are energized because of the path to ground established by the resistors 198, 200, and 148. However, when the output of the sensing means 34 is high, i.e., the daytime running light circuit is activated, the transistor will shut off because essentially equal voltages will be applied across the resistor 200.

Unless otherwise specified, the components used in the embodiments of FIGS. 2 and 3 are readily available to and assembled by one of ordinary skill in the art of circuit design. The NAND gates should include a Schmitt trigger having a threshold of approximately 4 volts, and could be, for example, a Motorola MC14093B. The bipolar transistors should be 40 volt devices, for example, a type 2N3904 for NPN transistors and a type 2N3906 for PNP transistors. Also, in the oscillator circuits, it is recommended that the capacitors be of the tantalum type and the resistors be 5% tolerance to avoid frequency deviations from design. Concerning specific components, it is recommended that the fuse 82 be no greater than a 5 amp fuse, that the zener diode 108 have a zener voltage of 16 volts, 10% tolerance such as a type 1N966A, and that the zener diode 112 have a zener voltage of 36 volts, 5% tolerance such as a type 1N974B.

It will be appreciated that the foregoing description of a preferred embodiment of the invention is presented by way of illustration only (and not by way of any limitation) and that various alternatives and modifications may be made to the illustrated embodiment without departing from the spirit and scope of the invention.

The embodiments of the invention in which an exclusive property or privilege is claimed are defined as follows:

1. In a motor vehicle lighting circuit including low beam and high beam headlights, a headlight switch having an off position, a low beam position, and a high beam position for selectively energizing no headlights, the low beam headlights, and the high beam headlights, respectively, and a high beam indicator operable when the high beam headlights are energized, the improvement comprising:
   means responsive to a sensed vehicle operating condition for energizing the high beam headlights at an intensity less than the full intensity at which the high beam headlights normally operate when the headlight switch is in the high beam position, the sensed operating condition including the headlight switch being in the off position; and
   means responsive to the sensed vehicle operating condition for disabling the high beam indicator, whereby the high beam headlights will improve conspicuity of the vehicle during daytime driving when the headlight switch is off and the high beam indicator will not give a false indication of full intensity high beam headlight operation.

2. A motor vehicle headlight circuit capable of providing power to the high beam headlights in response to a predetermined vehicle operating condition including the vehicle ignition switch being in the on position and the headlight switch being in the off position, thereby improving visibility of the vehicle during daytime driving, comprising:
   sensing means for determining whether the predetermined operating condition of the vehicle exists;
   oscillating means responsive to the existence of the predetermined operating condition for providing an oscillating signal;
   switching means responsive to the oscillating signal for switching on and off the power to the high beam headlights, the oscillating signal being of such a frequency so that light from the high beam headlights is maintained at a substantially constant level of intensity;
   indicating means responsive to power being applied to the high beam headlights for indicating to the driver of the vehicle that the high beam lights are operable; and
   disabling means responsive to the existence of the predetermined operating condition for disabling the indicating means.

3. The headlight circuit of claim 2 in which:
   the disabling means includes a switching transistor electrically connected between the high beam headlights and the indicating means, whereby the transistor is switched off when the predetermined operating condition is sensed.

4. The headlight circuit of claim 2 in which:
   the disabling means includes a silicon-controlled rectifier connected between the high beam headlights and the indicating means, whereby the gate-cathode junction of the silicon-controlled rectifier is not forward biased when the predetermined operating condition is sensed.

5. The headlight circuit of claim 2 in which:
   the sensing means includes circuit means for testing for the presence of both electrically energized inputs and electrically grounded inputs.

6. The headlight circuit of claim 2 in which:
   the predetermined operating condition for a vehicle having automatic transmission includes the transmission being in a position other than park.

7. The headlight circuit of claim 2 in which:
   the predetermined operating condition includes the vehicle parking brake being disengaged.

8. The headlight circuit of claim 2 in which:
   the predetermined operating condition includes the absence of any vehicle turn signal being activated.

9. The headlight circuit of claim 2 in which:
   the predetermined operating condition includes the motor vehicle seat belts being fastened.

* * * * *